(12) United States Patent
Abe (10) Patent No.: US 10,104,248 B2
(45) Date of Patent: Oct. 16, 2018

(54) IMAGE FORMING APPARATUS CONFIGURED TO PREDICT AN EVENT BASED ON RESOURCE INFORMATION

(71) Applicant: FUJI XEROX CO., LTD.

(72) Inventor: Takahide Abe, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/888,536

(22) Filed: Feb. 5, 2018

(65) Prior Publication Data

US 2018/0159994 A1 Jun. 7, 2018

Related U.S. Application Data

(63) Continuation of application No. 15/435,532, filed on Feb. 17, 2017, which is a continuation of application
(Continued)

(30) Foreign Application Priority Data

Oct. 11, 2013 (JP) ................. 2013-213538

(51) Int. Cl.
*G06F 3/12* (2006.01)
*H04N 1/00* (2006.01)
(Continued)

(52) U.S. Cl.
CPC ......... *H04N 1/00477* (2013.01); *G06F 3/121* (2013.01); *G06F 3/126* (2013.01);
(Continued)

(58) Field of Classification Search
None
See application file for complete search history.

(56) References Cited

U.S. PATENT DOCUMENTS

2011/0013924 A1* 1/2011 Hosoi ................ G03G 15/6508
399/83
2011/0051187 A1 3/2011 Konuma
(Continued)

FOREIGN PATENT DOCUMENTS

JP 2000-168977 A 6/2000
JP 2002-139964 A 5/2002
(Continued)

OTHER PUBLICATIONS

Communication dated Nov. 14, 2017 from the Japanese Patent Office in counterpart application No. 2017-019204.
(Continued)

*Primary Examiner* — Henok A Shiferaw
(74) *Attorney, Agent, or Firm* — Sughrue Mion, PLLC (57) ABSTRACT

An image forming apparatus includes: a schedule information generation unit that generates schedule information including an order of execution of received jobs; an acquisition unit that acquires resource information related to a resource used to execute a job; a prediction unit that predicts a timing of occurrence of an event that possibly occurs in the apparatus as the received jobs are executed in accordance with the order of execution on the basis of the schedule information and the resource information; a display information generation unit that generates display information for displaying a period of execution of the job to be executed and the timing of occurrence of the event along the same time axis, and for displaying a degree of influence of the event on execution of the job; and a display controller that controls display of the display information.

2 Claims, 7 Drawing Sheets

Related U.S. Application Data

No. 14/292,225, filed on May 30, 2014, now Pat. No. 9,723,162.

(51) Int. Cl.
  *G06K 15/00* (2006.01)
  *G06K 15/16* (2006.01)
  *G06K 15/02* (2006.01)

(52) U.S. Cl.
  CPC .......... *G06F 3/1235* (2013.01); *G06F 3/1259* (2013.01); *G06F 3/1285* (2013.01); *G06K 15/005* (2013.01); *G06K 15/16* (2013.01); *G06K 15/1823* (2013.01); *G06K 15/4065* (2013.01); *H04N 1/00411* (2013.01); *H04N 1/00644* (2013.01); *H04N 1/00663* (2013.01); *H04N 2201/0094* (2013.01); *H04N 2201/3215* (2013.01); *H04N 2201/3222* (2013.01); *H04N 2201/3273* (2013.01)

(56) References Cited

U.S. PATENT DOCUMENTS

| | | | |
|---|---|---|---|
| 2011/0188061 A1* | 8/2011 | Miyamoto | G06K 15/16 358/1.12 |
| 2012/0311586 A1 | 12/2012 | Inagaki | |
| 2013/0271480 A1 | 10/2013 | Daynes et al. | |
| 2013/0314722 A1 | 11/2013 | Tomita et al. | |
| 2014/0208335 A1 | 7/2014 | Endrikhovski et al. | |
| 2014/0355031 A1* | 12/2014 | Fukuda | G06F 3/1263 358/1.14 |

FOREIGN PATENT DOCUMENTS

| | | |
|---|---|---|
| JP | 2005131809 A | 5/2005 |
| JP | 2010-044141 A | 2/2010 |
| JP | 2010-049167 A | 3/2010 |
| JP | 2010-120319 A | 6/2010 |
| JP | 2010274569 A | 12/2010 |
| JP | 2011-022377 A | 2/2011 |
| JP | 2011048158 A | 3/2011 |
| JP | 2011-156751 A | 8/2011 |
| JP | 2011248031 A | 12/2011 |
| JP | 2013-171073 A | 9/2013 |

OTHER PUBLICATIONS

Communication dated Nov. 14, 2017 from the Japanese Patent Office in counterpart application No. 2017-019205.
Communication dated May 30, 2017, from the Japanese Patent Office in counterpart application No. 2013-213538.
Communication dated Dec. 6, 2016, from the Japanese Patent Office in counterpart application No. 2013-213538.
Communication dated Jan. 30, 2018 from the Japanese Patent Office in counterpart application No. 2017-019205.

* cited by examiner

IMAGE FORMING APPARATUS CONFIGURED TO PREDICT AN EVENT BASED ON RESOURCE INFORMATION

CROSS-REFERENCE TO RELATED APPLICATIONS

This application is a continuation of application Ser. No. 15/435,532, filed Feb. 17, 2017, which is a continuation of application Ser. No. 14/292,225, now U.S. Pat. No. 9,723,162, filed May 30, 2014, which is based on and claims priority under 35 USC 119 from Japanese Patent Application No. 2013-213538 filed Oct. 11, 2013.

BACKGROUND

(i) Technical Field

The present invention relates to an image forming apparatus and a recording medium.

(ii) Related Art

An image forming apparatus that forms a production printer that successively executes received jobs in response to a request from a user executes a large number of jobs, especially jobs that require a relatively long processing time. Thus, it is desirable that the image forming apparatus should have a function of providing a reservation status etc. of the jobs for the production printer.

SUMMARY

According to an aspect of the present invention, there is provided an image forming apparatus including: a schedule information generation unit that generates schedule information including an order of execution of received jobs; an acquisition unit that acquires resource information related to a resource used to execute a job; a prediction unit that predicts a timing of occurrence of an event that possibly occurs in the apparatus as the received jobs are executed in accordance with the order of execution on the basis of the schedule information and the resource information; a display information generation unit that generates display information for displaying a period of execution of the job to be executed and the timing of occurrence of the event along the same time axis, and for displaying a degree of influence of the event on execution of the job; and a display controller that controls display of the display information.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Embodiment

Figure 1:
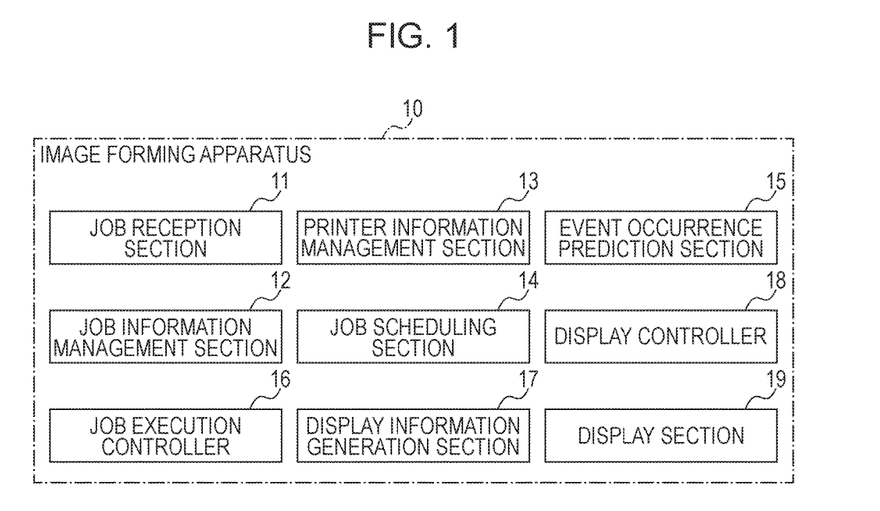
FIG. 1 is a block diagram illustrating an image forming apparatus according to an exemplary embodiment of the present invention.
Figure 2:
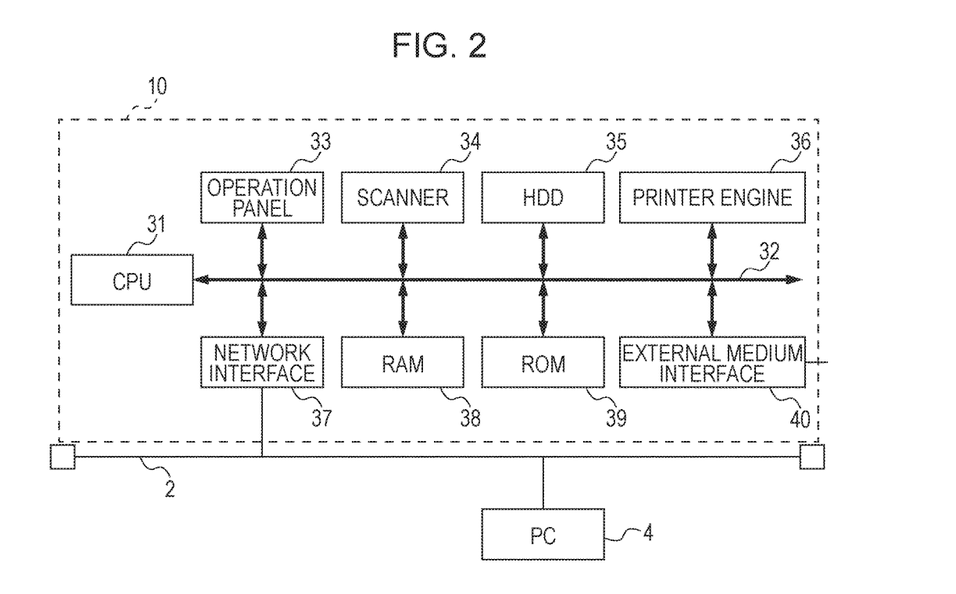
FIG. 2 illustrates the hardware configuration of the image forming apparatus according to the first exemplary embodiment.

FIG. 1 is a block diagram illustrating an image forming apparatus 10 according to an exemplary embodiment of the present invention. FIG. 2 illustrates the hardware configuration of the image forming apparatus 10 according to the exemplary embodiment. The image forming apparatus 10 is a multi-function device integrating various functions such as a print function, a copy function, and a scanner function, or a production printer specialized for the print function, and includes a computer. In FIG. 2 which illustrates the hardware configuration of a general-purpose multi-function device, a CPU 31 controls operation of various mechanisms integrated in the apparatus such as a scanner 34 and a printer engine 36 in accordance with a program stored in a ROM 39. An address data bus 32 is connected to the various mechanisms to be controlled by the CPU 31 for data communication. An operation panel 33 receives an instruction from a user, and displays information. The scanner 34 reads a document set by the user, and stores the document in a hard disk drive (HDD) 35 or the like as electronic data. The HDD 35 stores electronic documents etc. read using the scanner 34. The printer engine 36 prints an image on paper for output in accordance with an instruction from a control program executed by the CPU 31. A network interface 37 is connected to the network 2, and utilized to receive a job transmitted from a PC 4, transmit display information generated by the apparatus, transmit and receive an electronic mail, and allow access to the apparatus by way of a browser. A RAM 38 is utilized as a work memory during execution of a program and as a communication buffer during transmission and reception of electronic data. The ROM 39 stores various programs for execution, display control, etc. associated with a job for the apparatus. When the various programs are executed, components to be discussed later demonstrate predetermined processing functions. An external medium interface 40 interfaces with an external memory device such as a USB memory and a flash memory.

Returning to FIG. 1, the image forming apparatus 10 includes a job reception section 11, a job information management section 12, a printer information management section 13, a job scheduling section 14, an event occurrence prediction section 15, a job execution controller 16, a display information generation section 17, a display controller 18, and a display section 19. Components that are not necessary for description of the exemplary embodiment are not described. In the exemplary embodiment, information associated with a print job, among jobs that may be executed by the image forming apparatus 10, is displayed, and device components such as the printer engine 36 that operate to demonstrate the print function in accordance with a print job received by the image forming apparatus 10 are conveniently referred to as a "printer".

The job reception section 11 receives a print job transmitted from the PC 4 used by the user who requests printing. The job information management section 12 registers the job received by the job reception section 11 in a job cue (not illustrated), and keeps and manages information associated with the job such as a time required for a raster image processor (RIP) and job information related to each print job generated by the job scheduling section 14. The printer information management section 13 keeps and manages printer information associated with a resource for a printer. The printer information includes information related to the configuration of paper trays such as the size of paper stored in each paper tray and the maximum number of pieces of paper that may be stored in each paper tray, and information related to inks such as the color of toner in each ink cartridge and the number of pieces of paper that may be printed for each ink cartridge. The printer information also includes information related to the specifications of the printer, such as the printing speed of the printer, information related to an ejection tray (stacker) such as the maximum number of pieces of paper that may be accumulated in the ejection tray, and information serving as a determination criterion for execution of calibration and information serving as a determination criterion for execution of image quality adjustment specified by the number of printed pieces of paper, the printing time, or the like. In addition to such static information, the printer information also includes resource information indicating states after the received print job is executed, such as a predicted number of pieces of paper stored in each paper tray (number of remaining pieces of paper), a predicted remaining amount of toner in each ink cartridge, a predicted number of pieces of paper accumulated in the ejection tray (number of accumulated pieces of paper), a predicted number of pieces of paper printed by executing the print job after execution of the preceding calibration (number of printed pieces of paper), and a predicted number of pieces of paper printed by executing the print job after execution of the preceding image quality adjustment (number of printed pieces of paper).

The job scheduling section 14 is provided as a schedule information generation unit, and generates schedule information including the order of execution of received jobs and a processing time. Further, the job scheduling section 14 generates resource use information by calculating information related to a resource to be used (consumed) to execute a job, such as the size of paper (paper tray) used for printing to execute the job, the number of pieces of paper to be printed for each paper tray, the number of pieces of paper to be accumulated in the ejection tray (stacker), and the color and the amount of consumed ink(s). Then, the job scheduling section 14 generates job information including the schedule information and the resource use information.

The event occurrence prediction section 15 is provided as an acquisition unit, and acquires printer information including resource information related to a resource used to execute a job from the printer information management section 13. In addition, the event occurrence prediction section 15 is provided as a prediction unit, and predicts the timing of occurrence of an event that possibly occurs in the apparatus as the received jobs are executed in accordance with the order of execution on the basis of the acquired printer information and the job information kept by the job information management section 12. Further, the event occurrence prediction section 15 is provided as a specifying unit, and specifies the timing of execution of adjustment or human intervention to prevent possible occurrence of a trouble in an image forming process due to occurrence of an event.

The job execution controller 16 controls execution of a job. The display information generation section 17 is provided as a display information generation unit, and generates display information. The display information includes information for displaying the period of execution of the job to be executed and the timing of occurrence of the event along the same time axis, and information for identifiably displaying the degree of influence of the event on execution of the job. The display controller 18 is provided as a display controller, and controls display of the display information generated by the display information generation section 17. The display section 19 displays the display information on the operation panel 33 under display control by the display controller 18.

The components 11 to 19 of the image forming apparatus 10 are implemented through cooperation between a computer integrated in the image forming apparatus 10 and a program that operates on the CPU 31 integrated in the computer. The HDD 35 or the RAM 38 is used as a memory that allows the job information management section 12 and the printer information management section 13 to store information. Alternatively, an external memory may be utilized via network.

The programs used in the exemplary embodiment may be not only provided by a communication unit but also provided as stored in a computer-readable recording medium such as a CD-ROM and a DVD-ROM. The programs provided from the communication unit or the recording medium are installed on a computer, and sequentially executed by a CPU of the computer to achieve various processes.

Figure 3:
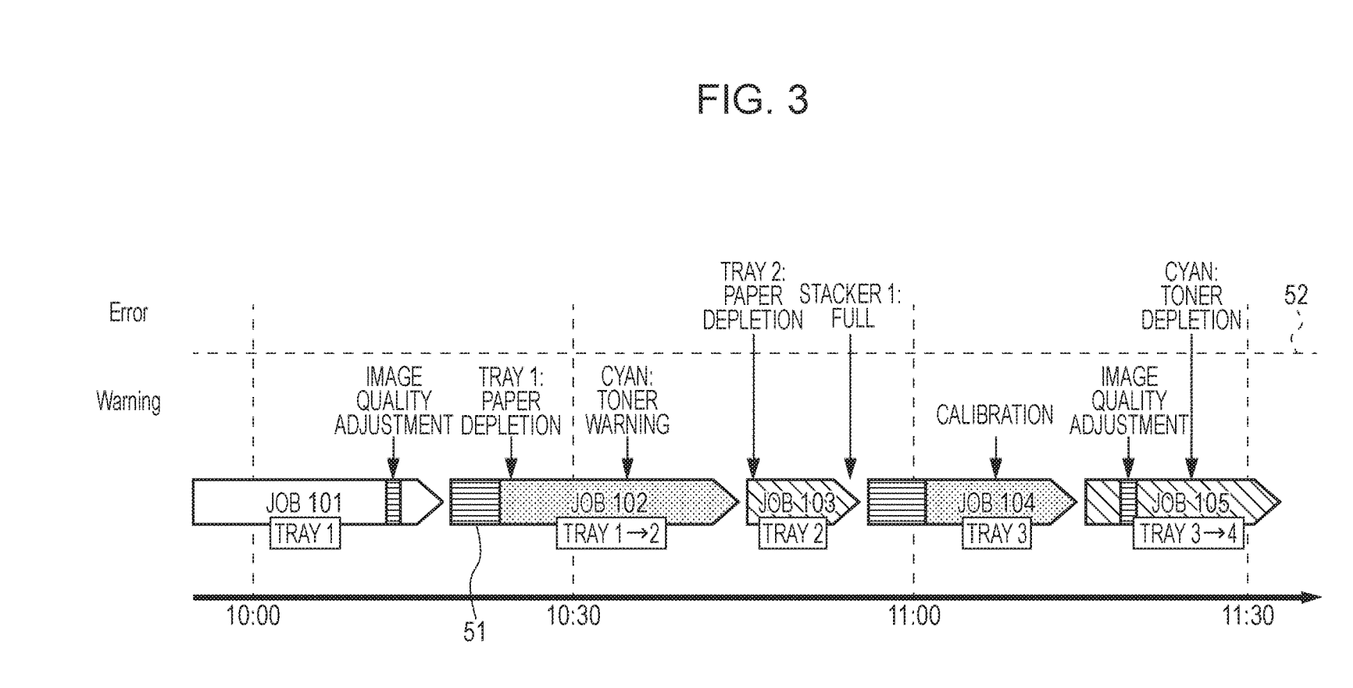
FIG. 3 illustrates a display example according to the first exemplary embodiment, in which the relationship between jobs and events is illustrated.

In the exemplary embodiment, information associated with print jobs to be executed is displayed. A display example according to the exemplary embodiment is illustrated in FIG. 3. In the exemplary embodiment, information related to events that are likely to occur in the future when the jobs are executed in accordance with the order of execution is displayed on the same time axis as that for the jobs. The term "event" refers to events that possibly occur in the image forming apparatus 10 along with execution of the jobs when the jobs are executed in accordance with the order of execution. In the exemplary embodiment, events that need adjustment or human intervention for the jobs to be executed successively are to be displayed. Examples of the events include depletion of consumable articles such as paper and toner, a stacker full (overflow) state, and calibration. In order to cope with such events, human intervention such as replenishment of paper, replacement of an ink cartridge, removal of printed materials from the stacker (ejection tray), and calibration adjustment is required. Other examples of the events include temporal variations and image degradations that may be caused as the print jobs are executed continuously. In order to cope with such events, adjustment such as calibration and image quality adjustment based on an automatic adjustment function of a printer is required. In general, the events are caused repeatedly as the print jobs are executed continuously.

The events may be divided in accordance with the security level (degree of influence) for execution of the print jobs, and divided into error-level events and warning-level events. When an error-level event is caused, operation of the printer is inevitably stopped. A warning-level event is not so substantial that operation of the printer may not necessarily be stopped even if such an event is caused, or occurrence of such an event itself is possibly avoidable. Examples of the former events include depletion of paper in a tray (depletion of paper of the same size), a stacker full state, and depletion of toner. Examples of the latter events include depletion of paper in a tray (with paper of the same size present in another tray), a toner depletion warning, image degradations that need image quality adjustment, and temporal variations that need execution of calibration.

Figure 4:
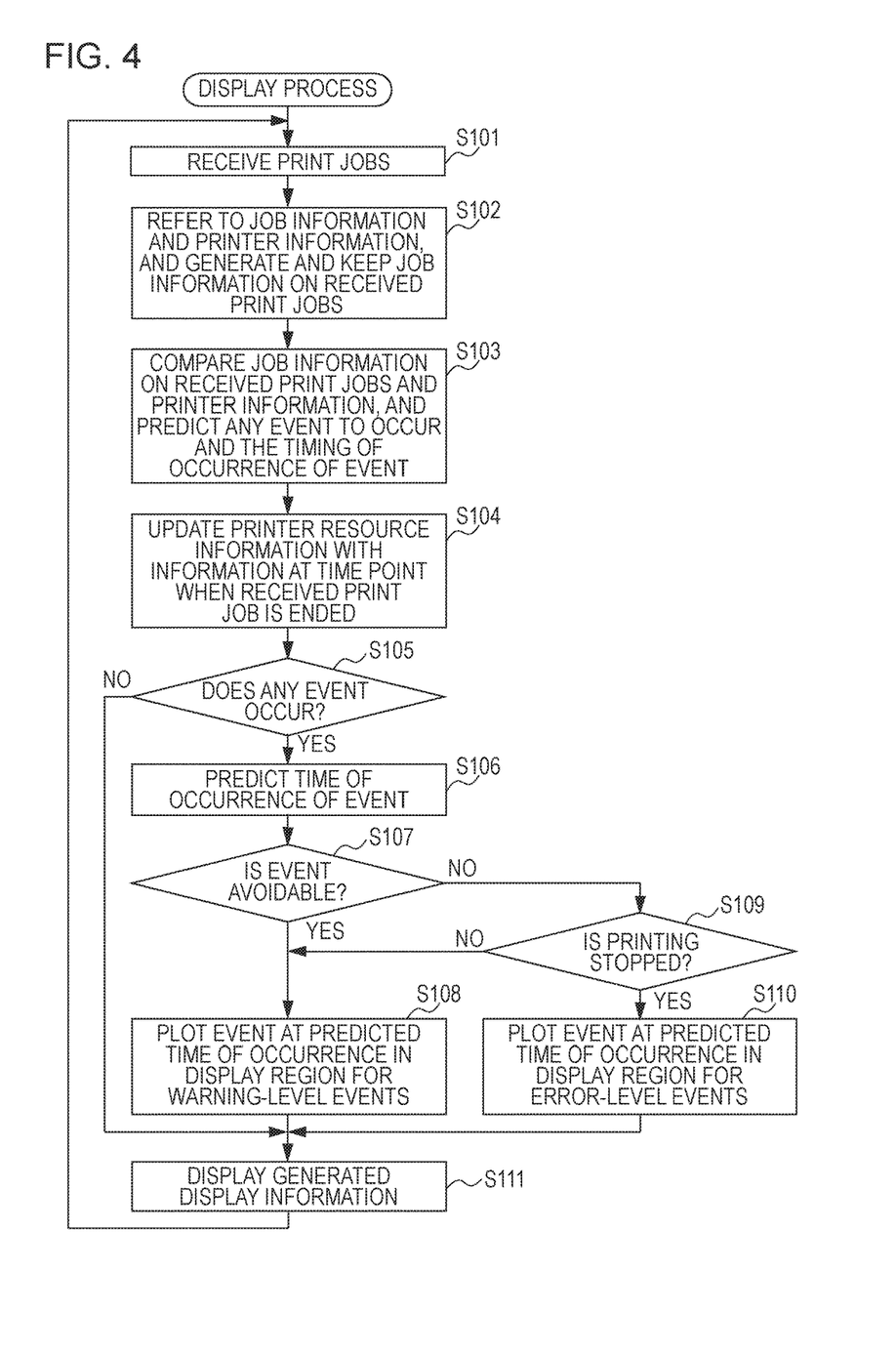
FIG. 4 is a flowchart illustrating a display process according to the first exemplary embodiment.

Next, a display process according to the exemplary embodiment will be described with reference to the flowchart illustrated in FIG. 4. When the display process according to the exemplary embodiment is started, the process keeps operating to update information being displayed with the latest information each time a job is received until instructed to end the process. Although not illustrated in the flowchart, information may be updated with the latest information each time execution of a job is ended. In the following description, expressions such as "during execution" and "after execution" of a print job are used, and print jobs that have not been executed yet at the present time are to be displayed. Thus, the expressions "during execution" and "after execution" mean that the print job will be being executed or will have been executed in the future, and do not mean that the print job is being executed or has been executed at the present time.

When the job reception section 11 receives print jobs (step S101), the job scheduling section 14 acquires job information from the job information management section 12 and printer information from the printer information management section 13. Then, the job scheduling section 14 calculates the processing time required to execute the received print jobs on the basis of the job information for the print jobs, the RIP included in the job information, and the printing speed included in the printer information, and further decides the order of execution of the print jobs. The job scheduling section 14 refers to information associated with paper included in the printer information, in addition to the schedule information including the processing time and the order of execution, to decide the paper tray to be used for the print job and the number of pieces of paper to be used (number of pieces of paper to be printed) for each paper tray, and further calculates the amount of toner to be consumed matching the amount of printing. Then, job information including the resource use information and the schedule information is generated, and kept and managed by the job information management section 12 (step S102).

Subsequently, in executing the received print jobs in accordance with the order of execution, the event occurrence prediction section 15 compares information on the received print jobs and the corresponding printer information to predict whether or not any event occurs when the received print jobs are executed, and in the case where any such event occurs, predict the timing of occurrence of the event (step S103) as follows.

First, the event occurrence prediction section 15 acquires job information on a received print job from the job information management section 12 and printer information from the printer information management section 13. Subsequently, the event occurrence prediction section 15 subtracts the number of pieces of paper to be consumed when the received print job is executed from the number of pieces of paper remaining in each paper tray included in the resource information of the printer information. In the case where the number of pieces of paper remaining in any paper tray reaches 0 as the result of the subtraction, it is determined that a paper depletion event occurs in the paper tray. In addition, the time point when the number of pieces of paper remaining in the paper tray reaches 0 is predicted as the timing of occurrence of the event. The timing of occurrence is estimated from the number of pieces of paper to be printed and the processing time for the print job through calculation. For example, assuming that printing is performed periodically in the processing time, the timing of occurrence is specified in the time of execution of the print job from the ratio between the number of pieces of paper to be printed and the processing time. The timing of occurrence is also specified in the same manner in the following description. In the case where paper of the same size as the paper to be depleted is not stored in any other paper tray, paper of the relevant size is completely depleted from the printer, which does not allow the printer to continue printing. In this case, the event is classified as an error-level event. In the case where paper of the same size as the paper to be depleted is stored in another paper tray, printing may be executed continuously without stopping the print job by switching between the paper trays. In this case, the event is classified as a warning-level event.

In addition, as with the paper trays, the event occurrence prediction section 15 subtracts the amount of toner to be consumed when the received print job is executed from the amount of toner remaining in each ink cartridge included in the resource information of the printer information. In the case where the amount of toner remaining in any ink cartridge reaches 0 (in the case where any ink cartridge is emptied) as the result of the subtraction, a toner depletion event occurs in the ink cartridge, and the time point when the ink cartridge is emptied is predicted as the timing of occurrence of the event. If toner for the relevant color is completely depleted, printing may not be executed continuously. In this case, the event is classified as an error-level event. The event occurrence prediction section 15 subtracts the amount of toner to be consumed when the received print job is executed from the amount of toner remaining in each ink cartridge. In the case where the difference obtained as the result of the subtraction is not 0 but is less than a certain amount set in advance, an event in which a warning (toner warning) that toner may soon be depleted from the ink cartridge is issued may be caused. In addition, the time point when the amount of toner remaining in the ink cartridge reaches the certain amount is predicted as the timing of occurrence of the event. If such a toner warning is issued, printing may be executed continuously. In this case, the event is classified as a warning-level event. Data indicating the certain amount to be compared with the remaining toner amount may be included in the printer information.

The amount of toner to be actually consumed in the print job to be executed is undetermined, and may be derived from the actual printing results in the past, such as the relationship between the number of printed pieces of paper and the amount of consumed toner.

Moreover, the event occurrence prediction section 15 acquires the maximum number of pieces of paper that may be accumulated on the ejection tray included in the printer information and the number of pieces of paper accumulated on the ejection tray, and compares a value obtained by adding the number of pieces of paper to be accumulated on the ejection tray when the received print job is executed to the number of pieces of paper accumulated on the ejection tray with the maximum number of pieces of paper that may be accumulated. In the case where it is determined as the result of the comparison that the sum is more than the maximum number of pieces of paper that may be accumulated, it is determined that an overflow (stacker full) event occurs in the ejection tray, and the time point when the sum exceeds the maximum number is predicted as the timing of occurrence of the event. When the stacker is full, printing may not be executed continuously. In this case, the event is classified as an error-level event.

Further, in the case where the number of pieces of paper to be printed for the received print job is added to the sum of the numbers of pieces of paper printed for the print jobs executed earlier after execution of the preceding calibration, and it is determined that the resulting sum reaches a value indicated by information (number of printed pieces of paper) serving as a determination criterion for execution of calibration, the event occurrence prediction section 15 predicts that an event of temporal variations that need execution of calibration is caused, and predicts the time point when the sum reaches the value as the timing of occurrence of the event. The printing time may be used in place of the number of printed pieces of paper.

In the case where the number of pieces of paper to be printed for the received print job is added to the sum of the numbers of pieces of paper printed for the print jobs executed earlier after execution of the preceding image quality adjustment, and it is determined that the resulting sum reaches a value indicated by information (number of printed pieces of paper) serving as a determination criterion for execution of image quality adjustment, the event occurrence prediction section 15 predicts that an event of temporal variations that need image quality adjustment is caused, and predicts the time point when the sum reaches the value as the timing of occurrence of the event. The printing time may be used in place of the number of printed pieces of paper.

When the event occurrence prediction section 15 predicts whether or not an event of various types occurs, and in the case where such an event occurs, predicts the timing of occurrence of the event as described above, the resource information included in the printer information is updated with values calculated in the course of the prediction process, such as the number of pieces of paper remaining in each paper tray, the amount of toner remaining in each ink cartridge, and the number of pieces of paper accumulated on the ejection tray after execution of the print job, the number of pieces of paper printed in the print jobs executed after the preceding calibration, and the number of pieces of paper printed in the print jobs executed after the preceding image quality adjustment (step S104).

Subsequently, the display information generation section 17 generates display information on the basis of information related to an event and job information on the print jobs as follows.

In the case where it is determined as the result of the prediction performed by the event occurrence prediction section 15 that an event occurs (Y in step S105), the display information generation section 17 calculates a predicted time of occurrence of each event (step S106). The print jobs are executed in accordance with the order of execution, and the predicted time of occurrence of each event is calculated by adding the processing time of each print job executed earlier and the timing of occurrence of the event in the print job.

In the case where the event is avoidable (Y in step S107), the event is plotted at a position for the corresponding time in a display region for messages for warning-level events (step S108). On the other hand, in the case where the event is not avoidable (N in step S107), and in the case where printing is inevitably stopped if the event occurs (Y in step S109), the event is plotted at a position for the corresponding time in a display region for messages for error-level events (step S110). For example, in the case where an event such as paper depletion or a stacker full state occurs, printing is stopped. Meanwhile, in the case where printing may not necessarily be stopped even if the event occurs (N in step S109), the event is plotted at a position for the corresponding time in the display region for messages for warning-level events (step S108). For example, printing may not necessarily be stopped even if an event such as an advance notice of occurrence of toner depletion (toner warning) or calibration occurs.

The display information generation section 17 generates information related to an event as described above, and generates information for displaying each print job along a time axis on the basis of job information on each print job irrespective of whether or not an event occurs.

When the display information generation section 17 generates display information, the display controller 18 instructs the display section 19 to display the display information. The display section 19 displays the display information on the operation panel 33 in accordance with the instruction (step S111).

The display process described above is executed repeatedly each time a print job is received to update the display content.

A display example displayed in this way is illustrated in FIG. 3. The form of the display content characteristic of the exemplary embodiment will be described using the display example.

In FIG. 3, print jobs (jobs 101 to 105) to be executed are indicated along a time axis. Although the time is indicated by the time axis in the exemplary embodiment, the time may be indicated by the time elapsed since the time when execution of the first job (job 101) is started. Each print job is displayed as a band-shaped icon with a length matching the processing time. If the RIP does not complete a process in time and there is an unoccupied time, or if there is a time period for which the printer is subjected to image quality adjustment or the like and does not actually perform printing, such a time is displayed differently from an icon for a print job to be visually distinguishable. In FIG. 3, a horizontally lined icon 51 is used to indicate a time period for which printing is not actually performed.

An icon for each job is displayed in accordance with the security level of the corresponding event. Specifically, an icon for a job for which occurrence of a warning-level event is predicted (jobs 102 and 104) is displayed as dotted, and an icon for a job for which occurrence of an error-level event is predicted (jobs 103 and 105) is displayed as hatched with downward sloping lines. Although both a warning-level event and an error-level event possibly occur for the job 105, the job 105 is displayed using an icon for an event at the higher security level. A job correlated with no event (job 101) is displayed as an outline icon with no pattern. Icons for print jobs are displayed such that icons correlated with an event at a high security level are conspicuous. Although the jobs are depicted with different patterns in accordance with the level of the corresponding event for convenience in FIG. 3, the jobs may be displayed with different colors, shapes, or other attributes to facilitate specifying the level of the corresponding event. For example, an icon for a print job correlated with an error-level event may be displayed in red, and an icon for a print job correlated with a warning-level event may be displayed in yellow.

The display region for events is divided by a broken line 52 in accordance with the security level. In the exemplary embodiment, warning-level events and error-level events are displayed distinguishably. In the exemplary embodiment, error-level events at a higher security level are displayed above warning-level events so as to be conspicuous.

Events are displayed at a position corresponding to the timing of occurrence (time of occurrence) of each event. Each event is displayed with an arrow facilitating understanding of correlation of the event with a print job, during execution of which the event occurs.

Further, each print job is displayed together with information indicating the paper tray to be used. From the display example illustrated in FIG. 3, it is seen that the tray 1 is used for the job 101, and that the tray 1 and then the tray 2 are used for the job 102, for example. Similar information may be provided for ejection trays (stackers).

Second Embodiment

In the exemplary embodiment, the display example illustrated in relation to the first exemplary embodiment described above is modified such that the time scale is changeable. The components according to the exemplary embodiment may be the same as those according to the first exemplary embodiment.

Figure 5:
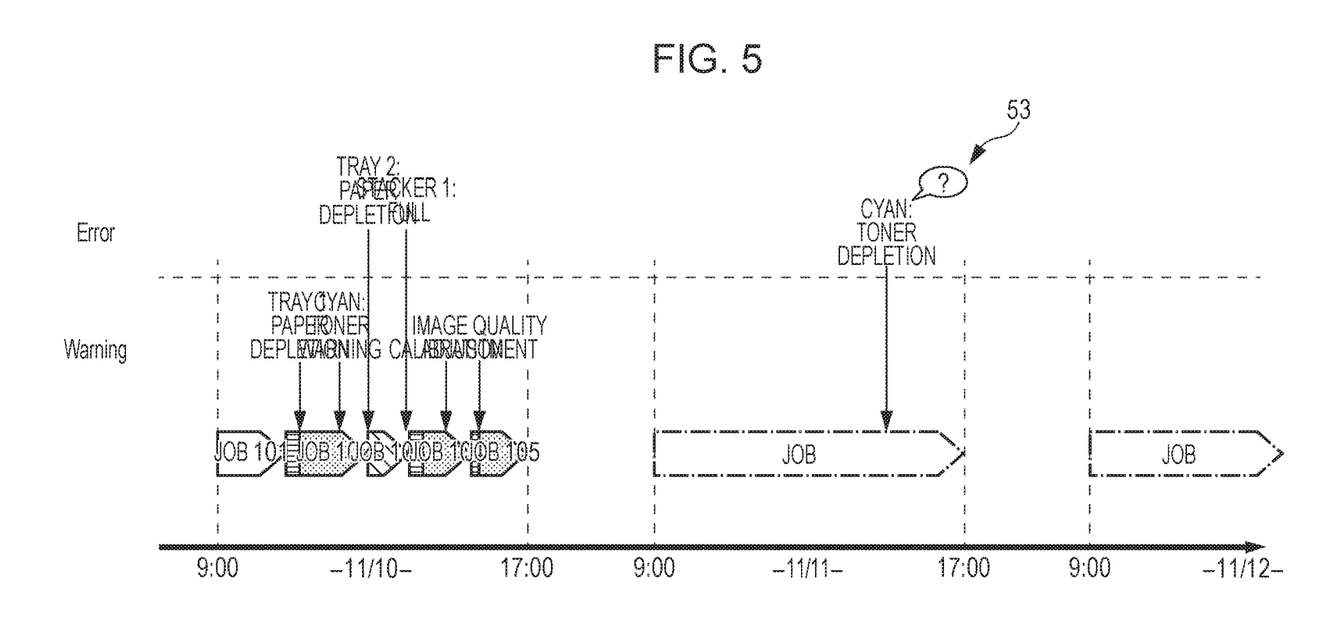
FIG. 5 illustrates a display example according to a second exemplary embodiment, in which the relationship between jobs and events is illustrated.

FIG. 5 illustrates a display example of a schedule according to the exemplary embodiment. As illustrated in FIG. 5, the scale of the time axis has been changed from that of the display example illustrated in FIG. 3. Specifically, the user may freely set a time range that he/she desires to display. That is, when the start and the end of a time range to be displayed are designated, the display controller 18 causes the display section 19 to display display information for the designated range.

Rather than allowing the user to designate the time range, the user may be allowed to set the unit of display for the time axis. For example, if it is desired to survey occurrence of events for a long range, display may be made by a relatively long unit such as day or week. In the case where it is desired to know upcoming events that are to occur, meanwhile, switching may be made to display by a relatively short unit such as minute or hour.

Rather than allowing the user to designate the time range, display levels with different scales may be set in advance, and the user may be allowed to select one of the display levels. For example, levels for various purposes such as a detail check level, an operation check level, and a maintenance check level are set in advance, and a display level selection screen is displayed on the operation panel 33. Then, when the user selects a display level, the display controller 18 causes the display section 19 to make display corresponding to the selected display level. The content of each display level is as follows.

At the detail check level, only upcoming events (events that are to occur in at most several hours) are displayed. The detail check level is appropriate to check replenishment of paper trays with paper, the stacker capacity, image quality adjustment, or the like. At the operation check level, events are displayed at a scale of a half to full day. The operation check level is appropriate to check events that occur once to several times a day (for example, calibration). At the maintenance check level, events are displayed at a scale of several days to a week. The maintenance check level is appropriate to check events that require a service or an order such as toner depletion. It is also possible to estimate the timing to order paper utilizing past data.

Further, in the case where a time period for which a print job is not scheduled is included in the display range as illustrated in FIG. 5, a consumable article replacement event may be predicted and displayed, assuming that printing is performed in an operating time (that may be reset by the user). In this case, the relevant event is displayed with an icon 53 indicating that the event is based on less reliable information in a visually recognizable manner.

In FIG. 5, information provided from 9 o'clock to 17 o'clock on November 10 is difficult to read with overlapping characters. When it is desired to read such characters, the scale of the time axis may be changed to check the display content.

Third Embodiment

Figure 6:
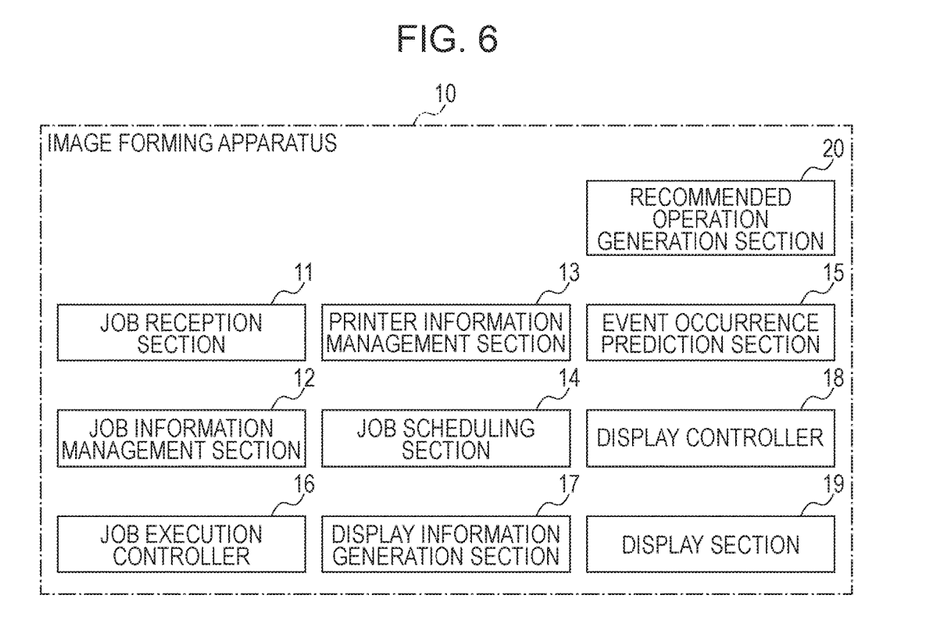
FIG. 6 is a block diagram illustrating an image forming apparatus according to a third exemplary embodiment.

FIG. 6 is a block diagram illustrating an image forming apparatus 10 according to the exemplary embodiment. The image forming apparatus 10 according to the exemplary embodiment is obtained by adding a recommended operation generation section 20 to the configuration according to the first exemplary embodiment. The recommended operation generation section 20 is provided as a specifying unit, and specifies the timing of execution of a process for preventing possible occurrence of an event. The configuration of the other components may be the same as that of the first exemplary embodiment, and thus will not be described.

Figure 7:
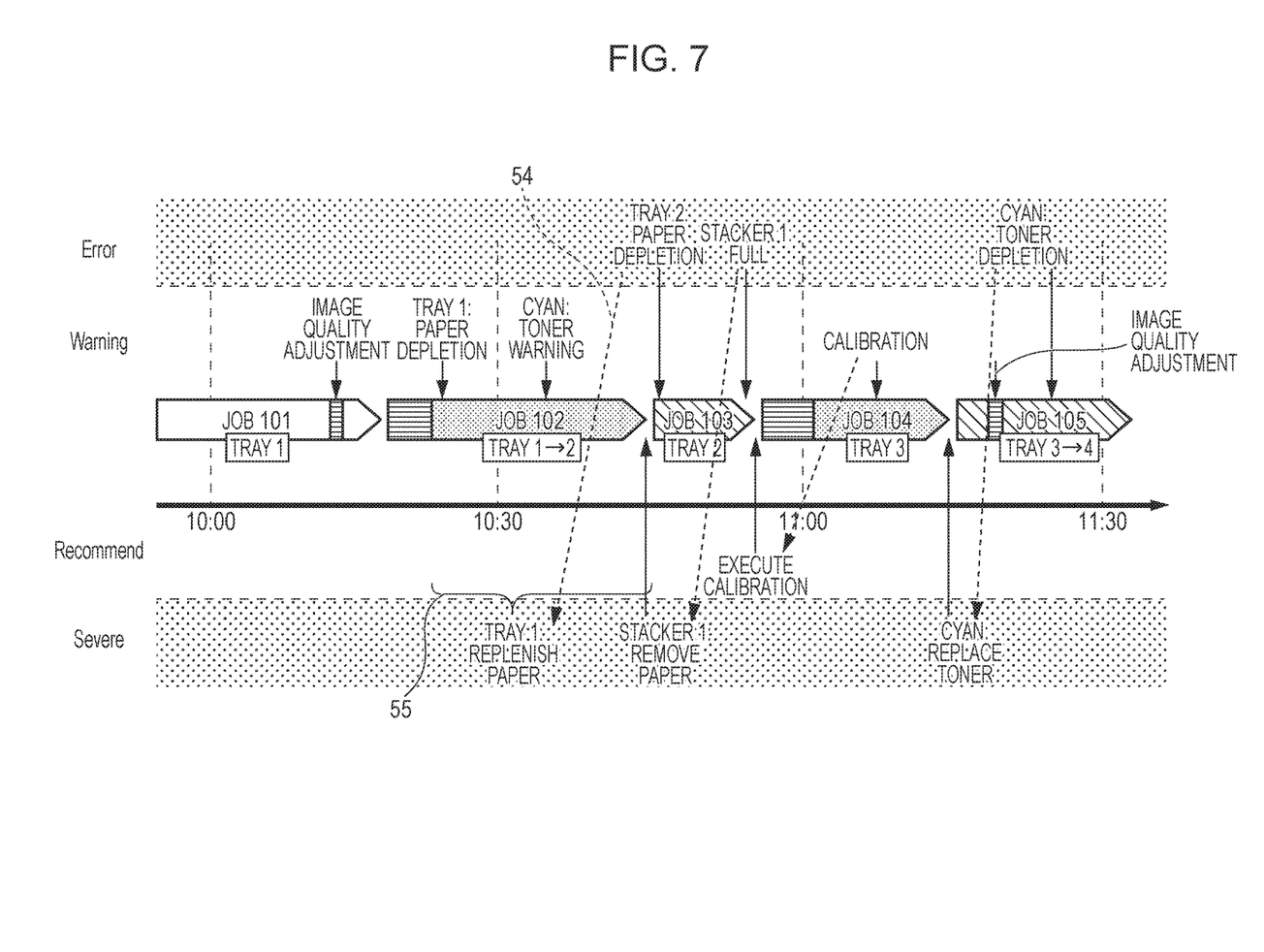
FIG. 7 illustrates a display example according to the third exemplary embodiment, in which the relationship between jobs, events, and recommended operations is illustrated.

FIG. 7 illustrates a display example obtained by adding processes (recommended operations) to be performed for events and the timings of execution of such processes to the display example illustrated in FIG. 3.

For example, possible occurrence of an event "stacker 1: full" may be prevented by removing pieces of paper (printed materials) accumulated on the stacker 1 before the stacker 1 becomes full. The pieces of paper accumulated on the stacker 1 are preferably removed before execution of the job 103, during which the "stacker 1: full" event is to occur, is started after execution of the preceding job 102 is ended, rather than while the job 103 is temporarily stopped. Thus, the process (recommended operation) for preventing possible occurrence of an event "stacker 1: full" includes removing pieces of paper from the stacker 1 ("stacker 1: remove paper"), and the process is executed after execution of the job 102 is ended and before execution of the job 103 is started.

The recommended operation generation section 20 refers to the printer information to specify a recommended operation for preventing occurrence of an event and the timing of execution of the recommended operation. The display section 19 displays a recommended operation for an event at a position corresponding to the timing of execution of the recommended operation in a recommended operation display region. The display information generation section 17 generates display information including information related to the recommended operations generated by the recommended operation generation section 20 such that the recommended operations are also displayed along the same time axis as that for the jobs and the events.

The recommended operation display region is divided in accordance with the level of events as with the security level. Specifically, recommended operations corresponding to warning-level events are displayed in a "Recommend" region, and recommended operations corresponding to error-level events are displayed in a "Severe" region. In order to facilitate understanding of correspondence between the levels, the display region related to the error-level events are displayed as dotted.

Further, the display information generation section 17 associates the events and the recommended operations using broken arrows 54 indicating the correspondence between the events and the recommended operations such that the correspondence may be grasped at a glance. That is, when the display illustrated in FIG. 7 is referred to, the user may understand that it is necessary to remove paper from the stacker 1 after execution of the job 102 is ended and before execution of the job 103 is started in order to avoid occurrence of an event "stacker 1: full".

Although the event "stacker 1: full" is used as an example in the description, the same applies to "calibration" and "image quality adjustment" events.

Meanwhile, in order to prevent possible occurrence of an error-level event "tray 2: paper depletion", the paper tray 1 for storage of paper of the same size (which has been depleted during execution of the job 102) may be replenished with paper to avoid interruption of a job (in the example, the job 103) even if paper in the paper tray 2 is depleted. For an event "tray 1: paper depletion" that occurs during execution of the job 102, paper of the same size is stored in the paper tray 2, and thus the printer automatically switches the supply source of paper to the paper tray 2 to avoid interruption of the job 102 even if paper in the paper tray 1 is depleted. Thus, the event "tray 1: paper depletion" is a warning-level event.

In order to avoid occurrence of an event "tray 2: paper depletion", it is also conceivable to replenish the paper tray 2 with paper. However, such replenishment would temporarily stop the job 103 being executed, and would not be appropriate. In order to avoid occurrence of an event "tray 2: paper depletion", it is suitable to replenish the paper tray 1 with paper before an event "tray 2: paper depletion" occurs. This is because such replenishment does not interrupt the job 103. Specifically, the paper tray 1 may be replenished with paper between the time when paper in the paper tray 1 is depleted and the time when paper in the paper tray 2 is depleted. Thus, the process (recommended operation) for preventing possible occurrence of an event "tray 2: paper depletion" includes replenishing the paper tray 1 with paper ("tray 1: replenish paper"), and the timing of execution falls between the time when paper in the paper tray 1 is depleted and the time when paper in the paper tray 2 is depleted. The recommended operation generation section 20 refers to information related to the configuration of the paper trays included in the printer information to specify a recommended operation for preventing occurrence of an event and the timing of execution of the recommended operation. In the case where a recommended operation may be performed in a time range as in the paper tray example, the display section 19 displays the timing of execution using a symbol 55 indicating such a range.

The recommended operation generation section 20 refers to the printer information to specify a recommended operation for preventing occurrence of an event and the timing of execution of the recommended operation. However, the recommended operation generation section 20 may prepare in advance a table in which events and the timing of execution of recommended operations that are suitable for the events are correlated, for example, and may refer to the table to specify a recommended operation and the timing of execution of the recommended operation.

Fourth Embodiment

Figure 8:
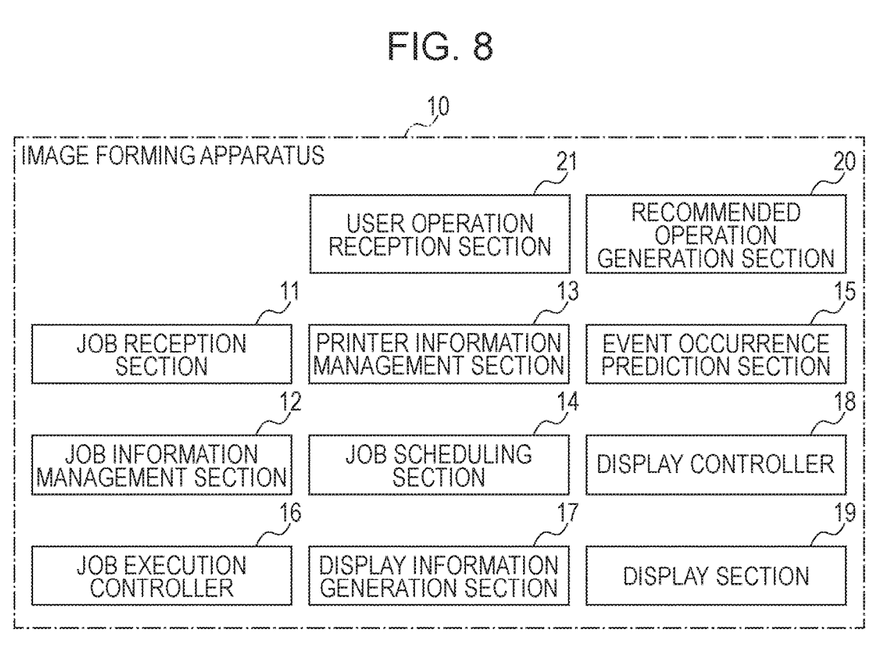
FIG. 8 is a block diagram illustrating an image forming apparatus according to a fourth exemplary embodiment.

FIG. 8 is a block diagram illustrating an image forming apparatus 10 according to the exemplary embodiment. The image forming apparatus 10 according to the exemplary embodiment is obtained by adding a user operation reception section 21 to the configuration according to the third exemplary embodiment. The user operation reception section 21 is provided as a display position reception unit, and receives a display position of the timing of execution of a recommended operation displayed by the display section 19 and changed by the user. In addition, the user operation reception section 21 is provided as an execution order reception unit, and receives an order of execution of jobs displayed by the display section 19 and changed by the user. The configuration of the other components may be the same as that of the third exemplary embodiment, and thus will not be described.

In the third exemplary embodiment, the timing of execution of a recommended operation for an event is specified by referring to the printer information or the content set in a table. However, the user occasionally desires to change the timing of execution of calibration, for example, to a timing that is determined to be appropriate in accordance with the number of pages printed after execution of the preceding calibration. In this case, the user performs a predetermined operation for moving a displayed recommended operation using a finger or a predetermined operation member on the display content on the operation panel 33. When the user operation reception section 21 receives the operation for movement, the display information generation section 17 generates display information reflecting the instruction for movement by the user. Then, the display section 19 displays display information updated in accordance with an instruction from the display controller 18. Consequently, the timing of execution of a recommended operation is displayed at a changed position.

When the user sees the display content on the operation panel 33, the user occasionally desires to change the scheduled order of execution of print jobs for purposes such as to reduce the number of times of replacement of paper as much as possible, to concentrate the timings of replacement of paper as much as possible, and not to cause calibration to occur during execution of a job performed for a long processing time, for example. In this case, the user performs a predetermined operation for replacing displayed icons for the print jobs using a finger or a predetermined operation member on the display content on the operation panel 33. When the user operation reception section 21 receives the operation for replacement, the display information generation section 17 generates display information reflecting the instruction for replacement by the user. Then, the display section 19 displays display information updated in accordance with an instruction from the display controller 18. Consequently, the order of execution of the print jobs is changed as desired by the user, and displayed in accordance with the changed order.

In addition, a trigger that allows the user to stop execution of a print job at a desired timing may be set. For example, a desired stop instruction operation is performed at a position at which it is desired to stop the print job in the recommended operation display region. When the user operation reception section 21 receives the stop instruction operation, the display information generation section 17 generates display information reflecting the stop instruction by the user. Then, the display section 19 displays display information updated in accordance with an instruction from the display controller 18. In addition, along with the update of display, the job information management section 12 reflects the change content also in the schedule information. Further, it is necessary to reflect the change content also in the registration information on a job cue or the like in order to actually execute a job.

For example, in the case where the user desires to reliably execute calibration, a desired stop instruction operation is performed at a position corresponding to the timing of execution of calibration. For example, if a stop instruction operation is performed between executions of print jobs, calibration may be performed at an appropriate timing, that is, between print jobs, by prohibiting execution of a print job that is the next to be executed from being started after execution of a print job is ended. In order to prohibit execution of a print job that is the next to be executed from being started, it is necessary that the job execution controller 16 should be informed of such calibration to control execution of calibration.

Although the display controller 18 according to the exemplary embodiment causes the display section 19 to display display information on the operation panel 33, display information may be transmitted to another computer such as the PC 4 connected by way of the network 2, for example, to be displayed.

Although the present invention is applied to print jobs in the exemplary embodiments described above, the present invention may also be applied to display of information related to jobs other than print jobs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a schedule information generator that generates schedule information of received print jobs which are to be executed, the schedule information including an order of execution of the print jobs;
an acquirer that acquires resource information related to paper to be used to execute the print jobs;
a predictor that predicts, based on the schedule information and the resource information, paper depletion that will occur in the image forming apparatus during the execution of the print jobs;
a display controller that controls to display execution time period of the print jobs along time axis and degree of influence of the predicted paper depletion regarding the execution of the print jobs by changing color of the displayed execution time period, and, in response to the degree being high, information on a tray in which the predicted paper depletion will occur, the information on the tray being displayed in an area which is divided by a line from an area in which the execution time period is displayed;
an auto switcher that switches trays, in response to paper being depleted during the execution of the print jobs, from a first tray in which the depletion occurs to a second tray in which same-sized paper with the paper in the first tray is loaded; wherein
the display controller controls, even in a case where the paper depletion occurs during the execution of the print jobs, not to display the information on the first tray in a case where the same-sized paper is loaded in the second tray and the trays are switched.

2. The image forming apparatus according to claim 1, further comprising:
a controller that controls to allow a user to load paper in the first tray without stopping the execution of the print jobs while the switched second tray is being used.

* * * * *